US006976682B1

United States Patent
Macleod et al.

(10) Patent No.: US 6,976,682 B1
(45) Date of Patent: Dec. 20, 2005

(54) APPARATUS AND METHOD FOR FORMING A ROTATABLE FERROFLUIDIC SEAL BETWEEN A SHAFT AND A HUB

(75) Inventors: Donald James Macleod, Scotts Valley, CA (US); Robert Michael Pelstring, Santa Cruz, CA (US); Marten Fredrick Byl, Los Gatos, CA (US); Jeffry Arnold LeBlanc, Aptos, CA (US); Tan Hung Pham, San Marcos, CA (US); Robert Alan Notingham, Santa Cruz, CA (US); Michael James Whittome, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/489,594

(22) Filed: Jan. 21, 2000

(Under 37 CFR 1.47)

Related U.S. Application Data

(60) Provisional application No. 60/116,758, filed on Jan. 22, 1999, provisional application No. 60/117,826, filed on Jan. 29, 1999, provisional application No. 60/121,687, filed on Feb. 25, 1999, and provisional application No. 60/124,629, filed on Mar. 16, 1999.

(51) Int. Cl.[7] ............................ F16J 15/33; F16C 19/00
(52) U.S. Cl. ....................................... 277/410; 384/446
(58) Field of Search ......................... 277/410; 384/133, 384/446, 478

(56) References Cited

U.S. PATENT DOCUMENTS

| | | | |
|---|---|---|---|
| 1,014,850 A | 1/1912 | Richardson | |
| 1,879,625 A | 9/1932 | Mendenhall et al. | |
| 1,879,627 A | 9/1932 | Mendenhall et al. | |
| 2,133,879 A | 10/1938 | Thearle | |
| 2,665,929 A | 1/1954 | Sawyer | |
| 2,834,618 A | 5/1958 | Wiltse | |
| 3,091,469 A | 5/1963 | Matt | |
| 3,567,231 A | 3/1971 | Albert | |
| 3,620,584 A | * 11/1971 | Rosensweig | ................ 384/446 |
| 3,694,042 A | 9/1972 | Rabenhorst | |
| 4,054,293 A | 10/1977 | Hoeg et al. | |
| 4,200,296 A | 4/1980 | Stahl et al. | |
| 4,304,411 A | 12/1981 | Wilcock et al. | |
| 4,357,021 A | 11/1982 | Raj et al. | |
| 4,357,024 A | 11/1982 | Raj | |
| 4,407,518 A | 10/1983 | Moskowitz et al. | |
| 4,426,088 A | 1/1984 | Ernst | |
| 4,444,398 A | 4/1984 | Black, Jr. et al. | |
| 4,455,026 A | 6/1984 | Pinkus et al. | |
| 4,478,424 A | 10/1984 | Raj | |
| 4,506,895 A | 3/1985 | Raj | |
| 4,527,802 A | 7/1985 | Wilcock et al. | |
| 4,565,379 A | 1/1986 | Ballhaus | |
| 4,604,229 A | 8/1986 | Raj et al. | |
| 4,681,328 A | 7/1987 | Ritter et al. | |

(Continued)

Primary Examiner—Alison Pickard
Assistant Examiner—Vishal Patel
(74) Attorney, Agent, or Firm—Morrison & Foerster LLP

(57) ABSTRACT

An apparatus and method are provided for sealing an outer surface 170 of a shaft 175 to an inner surface 165 of a hub 160. The seal includes a magnet 155, with top and bottom pole pieces 260, 265, and a ferrofluid 270 magnetically held in a gap 275 between the pole pieces 260, 265, and the hub 160 or the shaft 175. The top pole piece 260 has a cross-section that is L-shaped, with a horizontal portion 260a parallel to the magnet 155 and a shorter vertical portion 260b facing the shaft 175. In one version, the vertical portion 260b or the portion of the shaft 175 facing it is contoured to provide a flux gradient that axially concentrates the ferrofluid 270 in the gap 275. In another aspect, a catcher 335 is provided to reduce loss of ferrofluid 270 when the ferrofluidic seal 185 used to form an outside seal. In yet another aspect, a stationary ferrofluidic seal 345 is provided for sealing a stationary shaft 350 to a rotating hub 355.

8 Claims, 8 Drawing Sheets

U.S. PATENT DOCUMENTS

| | | | |
|---|---|---|---|
| 4,717,266 A | | 1/1988 | Hart, Jr. et al. |
| 4,830,384 A | * | 5/1989 | Raj et al. .................... 277/410 |
| 4,973,064 A | * | 11/1990 | Hosoya ....................... 277/410 |
| 5,007,513 A | | 4/1991 | Carlson |
| 5,009,436 A | | 4/1991 | Endo et al. |
| 5,018,751 A | | 5/1991 | Raj et al. |
| 5,050,891 A | * | 9/1991 | Ishikawa .................... 277/410 |
| 5,051,853 A | | 9/1991 | Hosoya |
| 5,061,868 A | | 10/1991 | Iwazaki et al. |
| 5,108,198 A | | 4/1992 | Nii et al. |
| 5,161,902 A | | 11/1992 | Fujii |
| 5,165,701 A | | 11/1992 | Koba |
| 5,238,254 A | | 8/1993 | Takii et al. |
| 5,267,737 A | | 12/1993 | Cossette et al. |
| 5,271,631 A | | 12/1993 | Yokouchi et al. |
| 5,473,484 A | | 12/1995 | Dunfield et al. |
| 5,617,272 A | | 4/1997 | MacLeod et al. |
| 5,660,397 A | | 8/1997 | Holtkamp |
| 5,675,199 A | | 10/1997 | Miyakoshi et al. |
| 5,676,472 A | | 10/1997 | Solomon et al. |
| 5,876,037 A | | 3/1999 | Ishizaki et al. |
| 6,029,978 A | | 2/2000 | Pelstring et al. |

* cited by examiner

APPARATUS AND METHOD FOR FORMING A ROTATABLE FERROFLUIDIC SEAL BETWEEN A SHAFT AND A HUB

CROSS REFERENCE TO RELATED APPLICATIONS

This application claims priority from U.S. Provisional Patent Applications Ser. No. 60/116,758 filed Jan. 22, 1999, Ser. No. 60/117,826 filed Jan. 29, 1999, Ser. No. 60/121,687 filed Feb. 25, 1999 and Ser. No. 60/124,629 filed Mar. 16, 1999.

FIELD OF THE INVENTION

The present invention relates generally to the field of disc drives, and more particularly to an apparatus and method for providing a reliable, ferrofluidic seal between a hub and a shaft of a spindle motor in a disc drive.

BACKGROUND OF THE INVENTION

Disc drives, including magnetic disc drives, optical disc drives and magnet-optical disc drives, are widely used for storing information. A typical disc drive has one or more discs for storing information in a plurality of concentric circular tracks. This information is written to and read from the discs using read/write heads mounted on actuator arms which are moved from track to track across surfaces of the discs by an actuator mechanism. The discs are mounted on a spindle which is turned by a spindle motor to pass the surfaces of the discs under the read/write heads. The spindle motor generally includes a shaft fixed to a baseplate and a hub, to which the spindle is attached, having a sleeve into which the shaft is inserted. Permanent magnets attached to the hub interact with a stator winding on the baseplate to rotate the hub relative to the shaft. One or more bearings between the hub and the shaft facilitate rotation of the hub.

The spindle motor also typically includes an exclusion seal to seal interfacial spaces between the hub and the shaft. This is necessary, because lubricating fluids or greases used in the bearings tend to give off aerosols or vaporous components that migrate or diffuse out of the spindle motor and into a disc chamber in which the discs are maintained. This vapor often transports other particles, such as material abraded from the bearings or other components of the spindle motor, into the disc chamber. These vapors and particles deposit on the read/write heads and the surfaces of the discs, causing damage to the discs and the read/write heads as they pass over the discs. Thus, the migration of these contaminants into the disc chamber must be prevented.

To prevent the migration of these contaminants into the disc chamber, the latest generation of spindle motors utilize a ferrofluidic seal between the shaft and the hub. Ferrofluidic seals are described in, for example, U.S. Pat. No. 5,473,484, which is incorporated herein by reference. A typical ferrofluidic seal consists of a ferrofluid, an axially polarized annular magnet and two magnetically permeable annular pole pieces attached to opposing faces of the magnet. The ferrofluid is conventionally composed of a suspension of magnetically permeable particles suspended in a fluid carrier. Generally, the magnet and the pole pieces are fixed to the hub and extend close to but do not touch the shaft. Magnetic flux generated by the magnet passes through the pole pieces and the shaft, which is also magnetically permeable, to magnetically hold the ferrofluid in gaps between the pole pieces and the shaft, thereby forming a seal.

As noted above, current ferrofluidic seals use a rotating design in which the magnet and pole pieces are affixed to the hub, and the ferrofluid seals with a fixed shaft. Although this design has worked well for conventional spindle motors, the latest generation of motors rotate at high speeds, often exceeding 13,000 revolutions per minute (rpm). The centrifugal forces developed at such high speeds often exceed the ability of the ferrofluidic seal's magnetic flux to hold the ferrofluid against the shaft due to the velocity gradient across the ferrofluid, resulting in the failure of the ferrofluidic seal to maintain a hermetic seal.

Accordingly, there is a need for a ferrofluidic seal that seals an outer surface of a shaft to an inner surface of a hub disposed about the shaft. It is desirable that the ferrofluidic seal provide a structure that is reliable at high rotational speeds. There is also a need for a method of forming such a ferrofluidic seal that does not increase either manufacturing time or costs for assembling a spindle motor in which the seal is used.

The present invention provides a solution to these and other problems, and offers other advantages over the prior art.

SUMMARY OF THE INVENTION

The present invention relates to an apparatus for sealing the outer surface of a shaft to an inner surface of a hub disposed about the shaft that solves the above problems.

According to one embodiment, a seal is provided having an annular magnet, with top and bottom pole pieces coupled to opposite poles thereof. The pole pieces have annular shapes and with interior radii that are larger than the radius of the outer surface of the shaft. The top pole piece includes a cross-sectional area that is L-shaped, with a long horizontal portion parallel to a surface of the pole of the magnet, and a shorter vertical portion parallel to the outer surface of the shaft. A ferrofluid is magnetically held between the vertical portion of the top pole piece and outer surface of the shaft to form a seal therebetween. Generally, the top pole piece is separated from the outer surface of the shaft by a gap that is smaller than the distance separating the top pole piece from the bottom pole piece. In one embodiment, the hub is rotatably supported about the shaft by a bearing including an inner race on the shaft an outer race affixed to the hub, and the gap is smaller then the distance separating the top pole piece from inner race of the bearing. Preferably the top pole piece has a curved corner where the vertical portion joins the horizontal portion to spread a magnetic flux gradient over a larger area thereby enabling the ferrofluid to be held over a larger area. More preferably, the vertical portion also includes a curved tip at its lower end.

In another embodiment, a seal is provided for sealing an outer surface of a magnetically permeable shaft to an inner surface of a hub disposed about the shaft. The seal has an annular magnet, with top and bottom pole pieces coupled to opposite poles thereof, and the top and bottom pole pieces facing a contoured portion of the outer surface of the shaft. More particularly, the contoured portion is in a facing relationship with the interior radius of the top pole piece. Ferrofluid is magnetically held in a gap separating the top pole piece from the outer surface of the shaft to form a seal therebetween. The contoured portion introduces a magnetic flux gradient that axially concentrates the ferrofluid in the gap between the top pole piece and shaft. In one version of this embodiment, the contoured portion includes a raised curved surface in a facing relationship with the top pole piece. The curved surface may be formed by a pair of axially separated grooves machined circumferentially about the outer surface of the shaft to form a curved surface between the grooves that is raised relative to the grooves. Alternatively, the contoured portion can include two inclined surfaces intersecting at an angle to form the apex of a ring about the shaft. The ring can be a separate element coaxial with and affixed to the shaft, or an integral part of the shaft itself. In a preferred version of this embodiment, the top pole piece has a cross-sectional area that is substantially L-shaped with a long horizontal portion parallel to a surface of a pole of the magnet, and a shorter vertical portion substantially parallel to the outer surface of the shaft. The top pole piece is positioned so that the vertical portion is in a facing relationship with the contoured portion.

In another aspect, the invention is directed to a seal for sealing an outer surface of a shaft to an inner surface of a magnetically permeable hub disposed about the shaft. The seal includes an annular magnet with a pair of annular pole pieces coupled to opposite poles thereof positioned between the shaft and the hub. The pole pieces are made from a magnetically permeable material and have exterior radii that are smaller than a radius of the inner surface of the hub. The seal further includes a catcher affixed to the inner surface of the hub. The catcher is an annular ring of magnetically permeable material that has a curved surface in a facing relationship to the exterior radii of the pole pieces. The ferrofluid is magnetically held in a gap separating the pole pieces from the catcher to form a seal therebetween, so that when the hub is rotated relative to the shaft, splashing and outward migration of the ferrofluid is greatly reduced. Preferably, the curved surface has a cross-sectional area having a U-shape, and is oriented with relation to the exterior radii of the pole pieces so that the open ends of the U-shape extend radially inward past the exterior radii of the pole pieces. The catcher can be made from a single piece, or can have a top and a bottom portion that are joined to form the curved surface, and one of which can be integrally formed with the hub. The catcher is affixed to the hub with an adhesive, and an o-ring or a plastic bonder. In one preferred embodiment, people pieces, ferrofluid, catcher and hub are made of electrically conductive materials such that the pole pieces are electrically coupled to the shaft, the ferrofluid is electrically coupled to the pole pieces and to the catcher, and the catcher is electrically coupled to the hub. More preferably, the outer radii of the pole pieces and the inner radius of the hub are selected so that the surface area of ferrofluid electrically coupling in the pole pieces to the catcher provider resistance of less than about $1 \times 10^9$ ohms.

In yet another aspect, the present invention is directed to a stationary ferrofluidic seal for sealing a stationary shaft to a rotating hub. The effects of the centrifugal forces which tend to cause the ferrofluid to move away from the magnet of a conventional ferrofluidic seal and overcome the ability of the seal's magnetic flux to hold the fluid against the shaft is countered by affixing the seal itself to the stationary shaft; a formed magnetic shield arm is attached to the rotating hub, so that the magnetic shield arm protrudes up through an inner diameter of the magnet and pole pieces of the seal. Thus, the rotating magnetic shield arm extends radially inward from the hub to the point between the magnet and the shaft, so that the velocity gradient of the ferrofluid decreases outward from the rotating surface of the magnetic shield arm towards the now stationary surface of the seal. By utilizing this approach, the ferrofluid nearest the shaft approaches the RPM of the motor but with a lower velocity, while the velocity of the ferrofluid near the magnet and pole pieces of the seal approaches zero. With the decrease in velocity of the ferrofluid at the shaft, the force that would normally tend to disperse the fluid has been diminished so that the integrity of the seal is maintained.

The present invention is particularly useful in a spindle motor such as used in a disc drive. A spindle motor generally has a base with a shaft coupled thereto, and a hub having an inner surface disposed about an outer surface of the shaft. An embodiment of a seal according to the present invention is positioned between the shaft and the hub to seal the outer surface of the shaft to the inner surface of the hub and to electrically couple the shaft to the hub.

These and various other features as well as advantages which characterize the present invention will be apparent upon reading of the following detailed description and review of the associated drawings.

DETAILED DESCRIPTION

Figure 1:
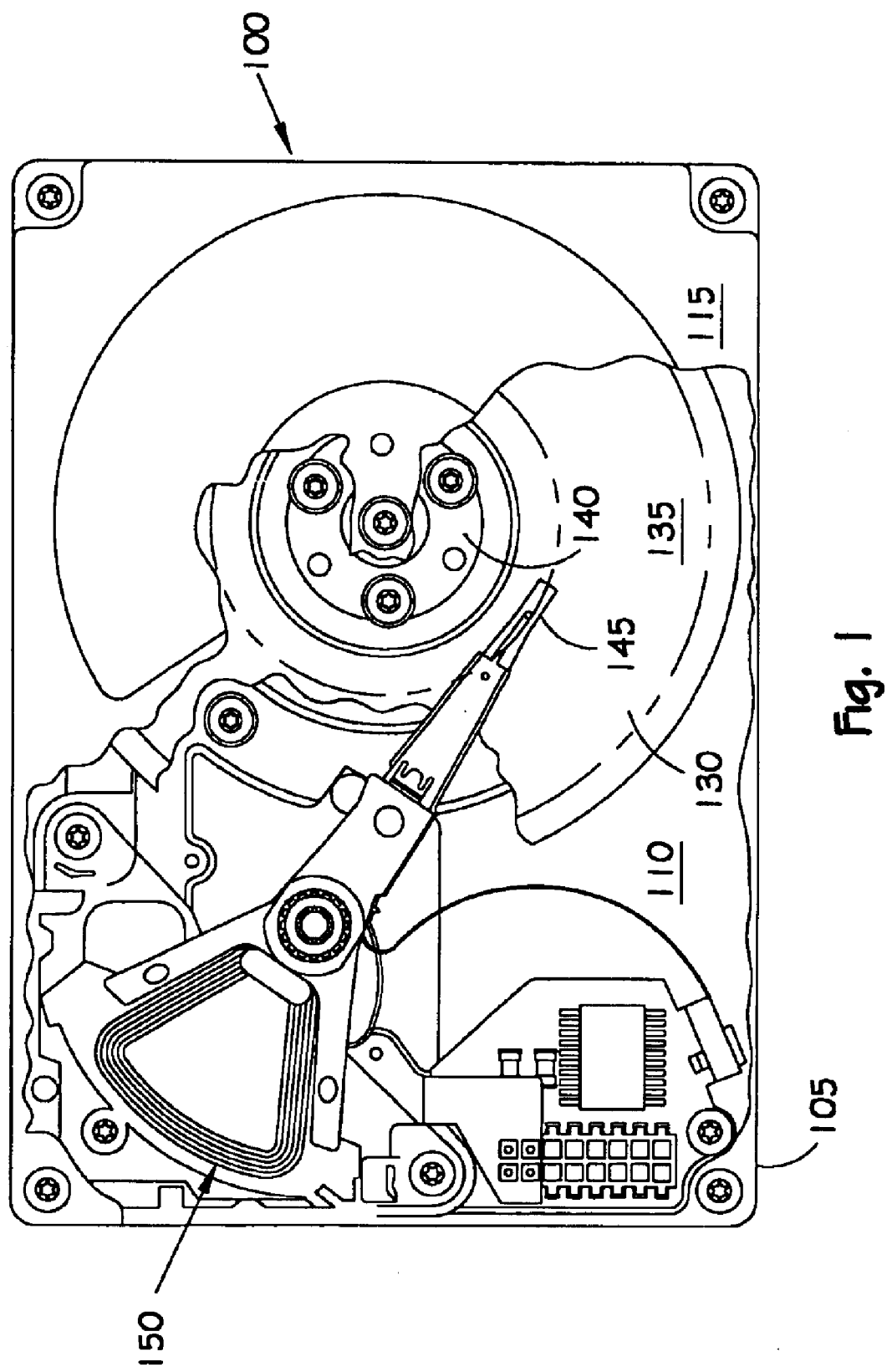
FIG. 1 (prior art) is a plan view of a disc drive in which a spindle motor incorporating a ferrofluidic seal according to the embodiment of the present invention is especially useful.

FIG. 1 is a plan view of a magnetic disc drive for which a spindle motor having a ferrofluidic seal according to the present invention is particularly useful. Referring to FIG. 1, a disc drive 100 typically includes a housing 105 having a base 110 joined to a cover 115. One or more discs 130 having surfaces 135 covered with a magnetic media (not shown) for magnetically storing information are attached to a spindle 140. A spindle motor (not shown in this figure) turns the spindle 140 to rotate the discs 130 past read/write heads 145 which are suspended above surfaces 135 of the discs by a suspension arm assembly 150. In operation, the discs 130 are rotated at high speed past the read/write heads 145 while the suspension arm assembly 150 moves the read/write heads in an arc over a number of radially spaced tracks (not shown) on the surfaces 135 of the discs 130. Thus, enabling the read/write heads 145 to read and write magnetically encoded information to the magnetic media on the surfaces 135 of the discs 130 at selected locations.

Figure 2:
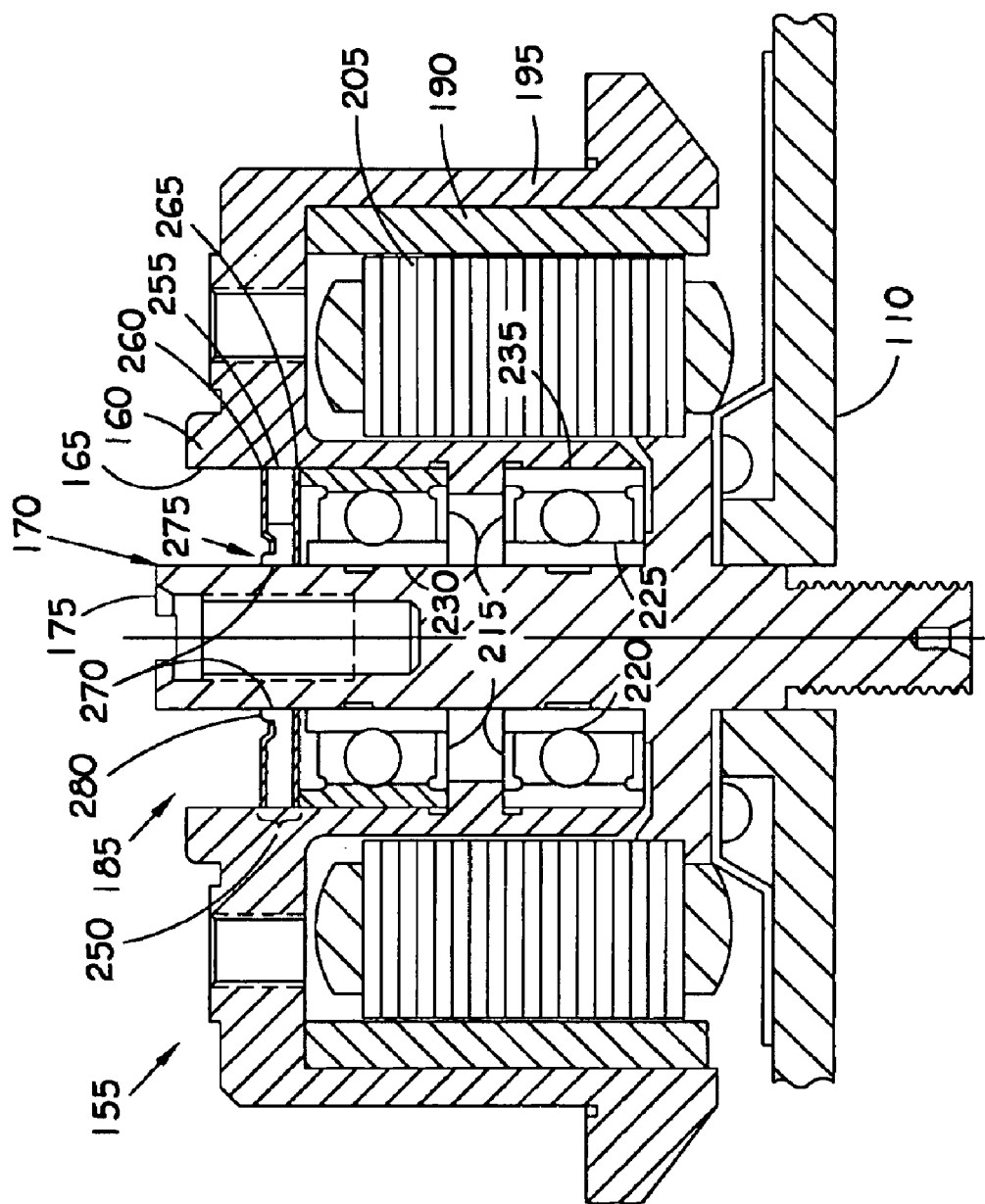
FIG. 2 (prior art) is a sectional side view of an embodiment of a spindle motor in which the present invention is useful, illustrating a ferrofluidic seal according to the prior art.

FIG. 2 is a sectional side view of a spindle motor 155 of a type which is especially useful in disc drives 100. Typically the spindle motor 155 includes a rotatable hub 160 having an inner surface 165 disposed about an outer surface 170 of a shaft 175. A ferrofluidic seal 185 seals the outer surface 170 of the shaft 175 to the inner surface 165 of the hub 160. One or more magnets 190 attached to a periphery 195 of the hub 160 interact with a stator winding 205 attached to the base 110 to cause the hub 160 to rotate. The hub 160 is supported on the shaft 175 by one or more bearings 215, such as fluid dynamic bearings (not shown) or ball bearings 215 as shown in FIG. 2. A ball-bearing generally includes one or more balls 220 loosely held by a retainer 225 between an inner race 230 and an outer race 235. Interfacial spaces (not shown) between the balls 220, the retainer 225 and the inner and outer races 230,235, can be filled with a lubricating fluid or grease to facilitate movement of the balls 220. The structure of the bearing 215 is not material to the invention. What is significant is that the ferrofluidic seal 185 must maintain a hermetic seal between the outer surface 170 of the shaft 175 and the inner surface 165 of the hub 160 so that the fluid, grease and other loose particles associated with the bearing 215 cannot reach the discs 130.

A typical ferrofluidic seal 185, such as shown in FIG. 2, includes a laminate 250 consisting of an annular magnet 255, with top and bottom pole pieces 260, 265, coupled to opposite poles thereof. The magnet 255 and pole pieces 260, 265, are attached and sealed, using an epoxy or solder, to the inner surface 165 of the hub 160 or the outer surface 170 of the shaft 175. A ferrofluidic fluid (ferrofluid 270) is magnetically held in a gap 275 between the pole pieces 260, 265, and the outer surface 170 of the shaft 175 or the inner surface 165 of the hub 160 to seal the shaft to the inner surface of the hub. The ferrofluid 270 typically includes ferromagnetic particles, such as $Fe_3O$ or magnetite, colloidally suspended in a carrier fluid, such as a hydrocarbon or synthetic ester based fluid. In a conventional ferrofluidic seal 185, the ferrofluid 270 forms a top meniscus 280, as shown in FIG. 2, that during dynamic operations can cause splashing and migration of the ferrofluid due to centrifugal force exerted on the ferrofluid of the rapidly rotating ferrofluidic seal. This splashing and migration can cause contamination of the discs 130 and loss of the hermetic seal.

Figure 3:
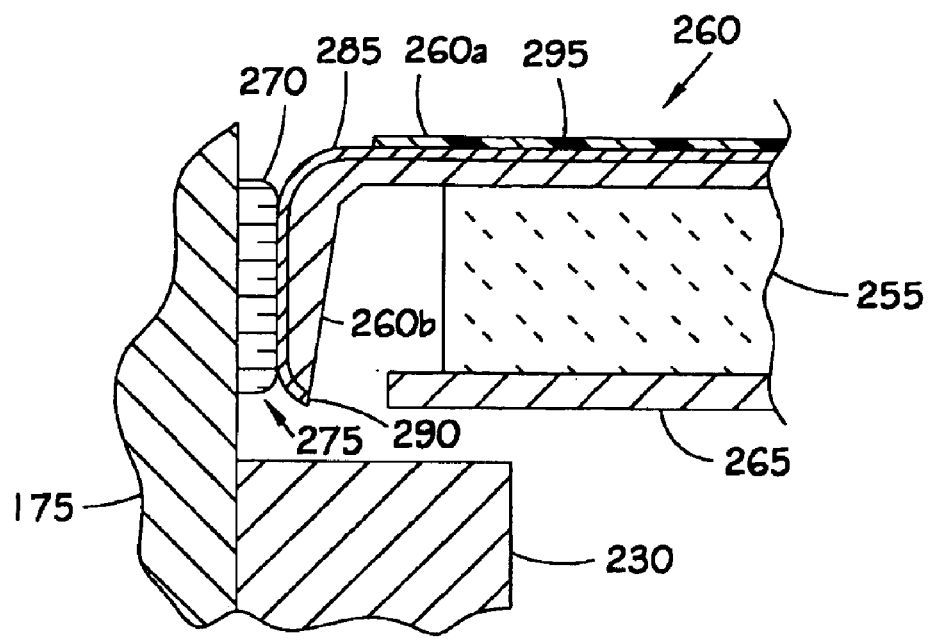
FIG. 3 is a partial sectional side view of ferrofluidic seal having an L-shaped top pole piece according to an embodiment of the present invention.

An embodiment of the ferrofluidic seal 185 according to the present invention that solves these problems will now be described in detail with reference to FIG. 3. In this particular embodiment, the ferrofluidic seal 185 is attached to the inner surface 165 of the hub 160 and in a facing, non-contact relationship with the outer surface 170 of the shaft 175. The ferrofluidic seal 185 can be attached to the inner surface 165 by any suitable means, such as an adhesive (as shown), a press fit or a snap ring (not shown). The ferrofluidic seal 185 includes an annular magnet 255, with top and bottom pole pieces 260, 265, coupled to opposite poles thereof. The ferrofluid 270 is magnetically held between the pole pieces and the outer surface 170 of the shaft 175 to hermetically seal the shaft to the inner surface 165 of the hub 160. The pole pieces 260, 265, have generally annular shapes and with interior radii that are larger than the radius of the outer surface 170 of the shaft 175. In accordance with the present invention, the top pole piece 260 includes a flat annular disk with a cylinder joined to an inner radius thereof to form a cross-sectional area that is substantially L-shaped. The L-shaped cross-sectional area has a long horizontal portion 260a extending radially parallel to a surface of the pole of the magnet 255, and a shorter vertical portion 260b parallel to the outer surface 170 of the shaft 175.

Generally, the top and bottom pole pieces 260, 265, are formed from a magnetically permeable material using a stamping process. Because the stamping process often leaves marks or scratches in surfaces of the pole pieces 260, 265, a thin layer or cladding 285 of a material, such as Nickel, is applied to the surfaces of the pole pieces. The cladding 285 may be applied using any suitable technique, such as electroplating, spraying, and a sputtering or evaporation deposition processes. The cladding 285 enhances operation of the ferrofluidic seal 185 by providing a smooth uniform surface against which the ferrofluid 270 can seal.

The top pole piece 260 is separated from the outer surface 170 of the shaft 175 by a gap 275 which is smaller than a distance separating the top pole piece from the bottom pole piece 265. When, as shown in FIG. 3, the shaft 175 is separated from the hub 160 by a bearing 215 including an inner race 230 on the shaft an outer race 235 affixed to the hub, the gap 275 separating the top pole piece 260 from the outer surface 170 of the shaft is also smaller than the distance separating the top pole piece from inner race 230 of the bearing 215.

Preferably, the surface of the vertical portion 260b facing the outer surface 170 of the shaft 175 is curved or rounded where it joins the horizontal portion 260a and at its lower end or tip 290. Sharp corners produce areas of high flux density that result in a lower magnetic force or pressure immediately above the corner than is necessary to hold the ferrofluid in place in this region. Rounding the corners spreads the magnetic flux gradient over a larger area enabling the ferrofluid to be held over a larger area. This in turn makes it possible to inject more ferrofluid 270 into the ferrofluidic seal 185 initially, thereby extending the life of seal, since ferrofluid is lost over time, for example due to evaporation, and below a certain amount is unable to maintain a hermetic seal. Moreover, from a manufacturing point of view, because the pole pieces 260, 265, are made by stamping, forming round corners is easier and therefore more economical.

Because the surface area of the seal with the outer surface 170 of the shaft 175 is directly proportional to the surface area of the vertical portion 260b of the top pole piece 260, it is it desirable to extend the portion of the top pole piece having a vertical cross-sectional area as much as possible. One way of accomplishing this is to reduce the interior radius of the bottom pole piece 265 such that the vertical portion 260b of the top pole piece 260 can extend between the bottom pole piece and the outer surface 170 of the shaft 175. To do so the vertical portion 260b of the top pole piece 260 is tapered from where it joins the horizontal portion 260a to its tip 290 in order to maintain a distance between the top pole piece and the bottom pole piece 265 that is greater than the gap 275.

To further reduce radial migration of the ferrofluid 270 away from the outer surface 170 of the shaft 175 a barrier film 295 is applied to the horizontal portion 260a of the top pole piece 260. The barrier film is formed from an oleophobic and hydrophobic fluoro-polymer that has a surface energy lower than the surface energy of the material of the top pole piece and lower than the surface tension of the ferrofluid 270. One suitable commercially available polymer is Nyebar®, commercially available from Nye Lubricants, Inc., of New Bedford, Mass.

The barrier film 295 may be formed by applying a thin layer or coating of the fluoro-polymer using any suitable technique, such as spin coating, spraying, sputter depositing and photolithograph processes. In a preferred embodiment, the fluoro-polymer is applied by dipping the top pole piece 260 into a solution of the fluoro-polymer material to form a thin layer bonded to the horizontal portion 260a of the top pole piece 260. A solvent dip is then used to remove excess material, and the top pole piece 260 degreased using vaporized solvent. Next, the fluoro-polymer is cured using air or oven drying to form a strong barrier film securely bonded to the horizontal portion 260a of the top pole piece 260.

Figure 4:
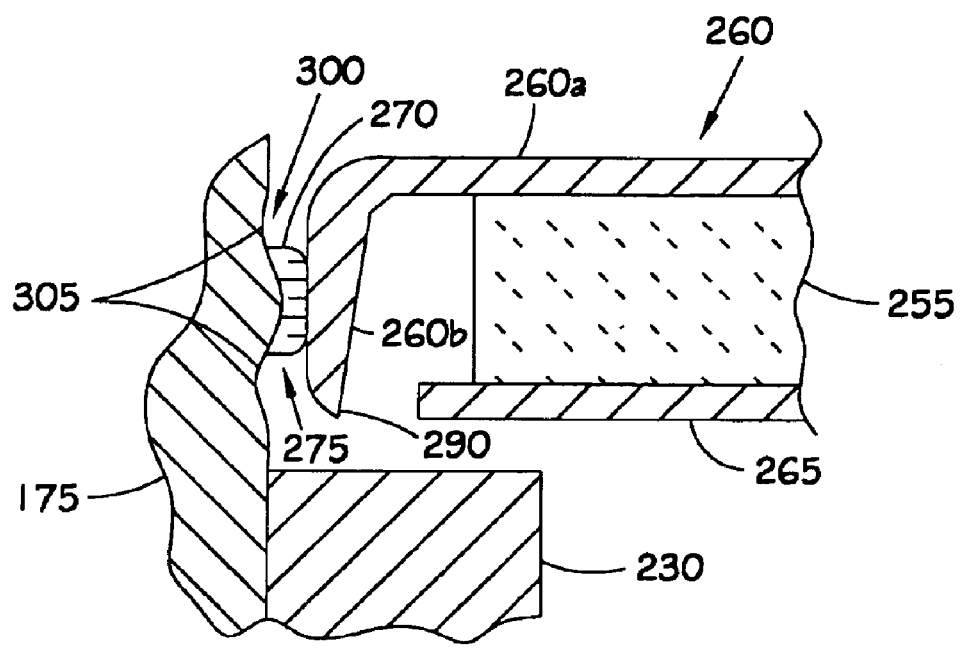
FIG. 4 is a partial sectional side view of ferrofluidic seal having an L-shaped top pole piece in a facing relationship with a contoured shaft according to an embodiment of the present invention.

In another embodiment, and shown in FIG. 4, the outer surface 170 of the shaft 175 facing top pole piece 260 has a contoured portion 300 to introduce a magnetic flux gradient that axially concentrates the ferrofluid 270 in the gap 275 between the top pole piece and shaft. This is desirable because when the magnetic flux along the gap 275 between the top pole piece 260 and shaft 175 is uniform, the fluid can move within this gap. Because the volume of ferrofluid 270 slowly decreases as the spindle motor 155 ages, the ferrofluid may not be located within the gap 275 in such away as to provide a complete seal, even though there is still a sufficient amount of ferrofluid. Thus, introducing a magnetic flux gradient allows the ferrofluid 270 in the gap 275 to be concentrated axially near a single point, typically the axial center of the vertical portion 260b. The contoured portion 300 is in a facing relationship with the interior radius of the top pole piece 260, the ferrofluid 270 is magnetically held in the gap 275 separating the top pole piece from the outer surface 170 of the shaft 175 to form a seal therebetween. In one version of this embodiment, the contoured portion 300 includes a raised curved surface formed by a pair of axially separated grooves 305 machined circumferentially about the outer surface 170 of the shaft 175.

Figure 5:
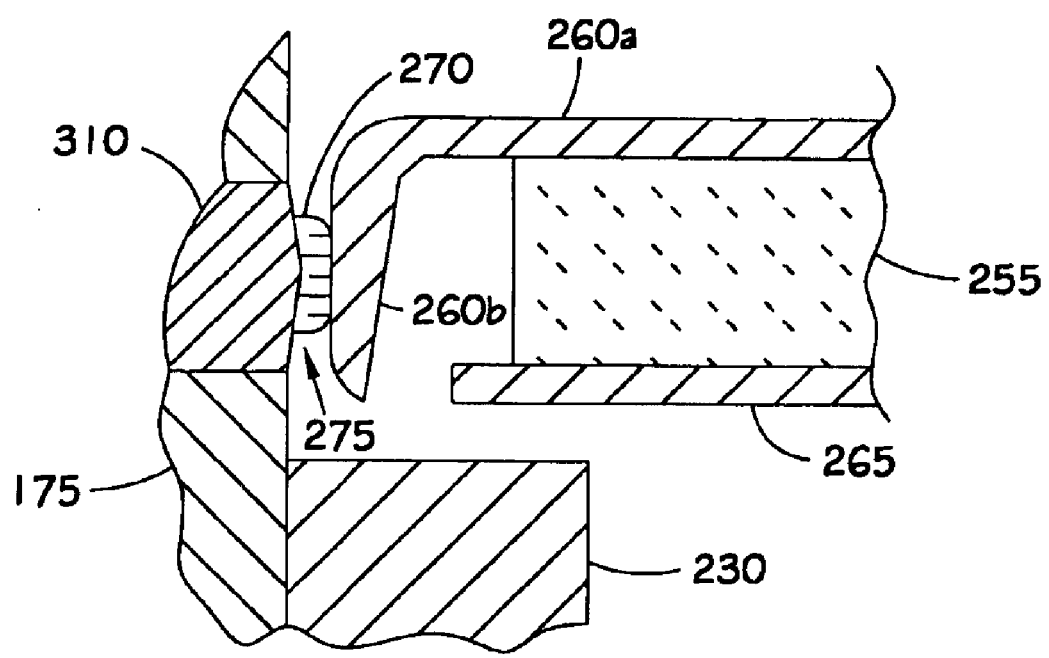
FIG. 5 is a partial sectional side view of ferrofluidic seal having an L-shaped top pole piece in a facing relationship with a contoured ring about a shaft according to an embodiment of the present invention.

Alternatively, as shown in FIG. 5 the contoured portion 300 can include two inclined surfaces intersecting at an angle to form the apex of a ring 310 about the shaft 175. The ring 310 can be an integral part of the shaft itself (not shown), or a separate element coaxial with and affixed to the shaft 175, as shown in FIG. 5. The later version has an additional advantage in that only the ring 310 need be made of a magnetically permeable material allowing the shaft to be made of a non-magnetic material, such as stainless steel, that has other desirable properties including high strength, high electrical conductivity, low cost and ease of machining.

In a preferred version of this embodiment, the top pole piece 260 has a cross-sectional area that is substantially L-shaped as described above, and is positioned so that the vertical portion 260b is in a facing relationship with the contoured portion 300.

Figure 6:
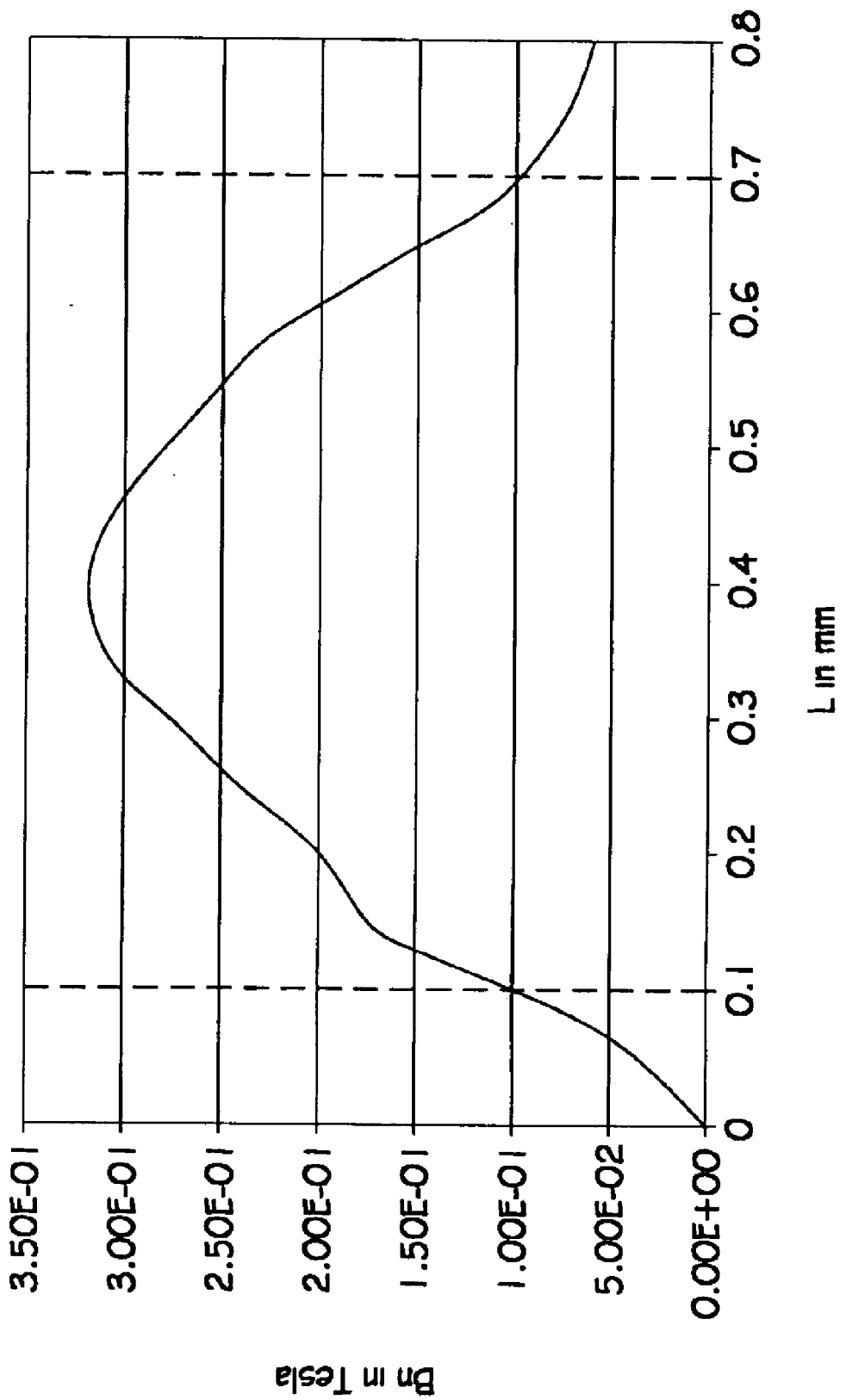
FIG. 6 is a graph showing the gradient in magnetic flux introduced in a ferrofluidic seal using any contoured shaft as shown FIG. 4.

FIG. 6 is a graph showing the gradient in magnetic flux introduced in a ferrofluidic seal 185 using a top pole piece 260 having a L-shaped cross-sectional area and having a contoured portion 300 as shown FIG. 4.

Figure 7:
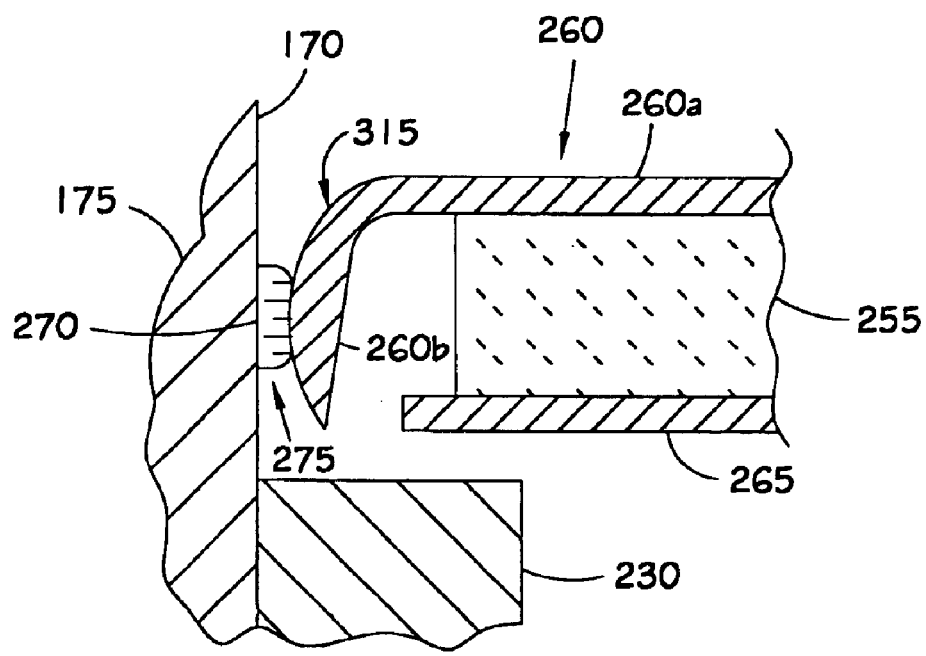
FIG. 7 is a partial sectional side view of ferrofluidic seal having an L-shaped top pole piece with a contoured surface in a facing relationship with a straight shaft according to an embodiment of the present invention.

Alternatively, as shown in FIG. 7, a surface 315 of the vertical portion 260b of the top pole piece 260 facing a straight shaft 175 can also be contoured to introduce the desired magnetic flux gradient. In this version, the surface of the vertical portion 260b facing the shaft 175 is curved or crowned to concentrate the lines of magnetic flux had a point near the axial center of the vertical portion of the top pole piece 255.

Figure 8:
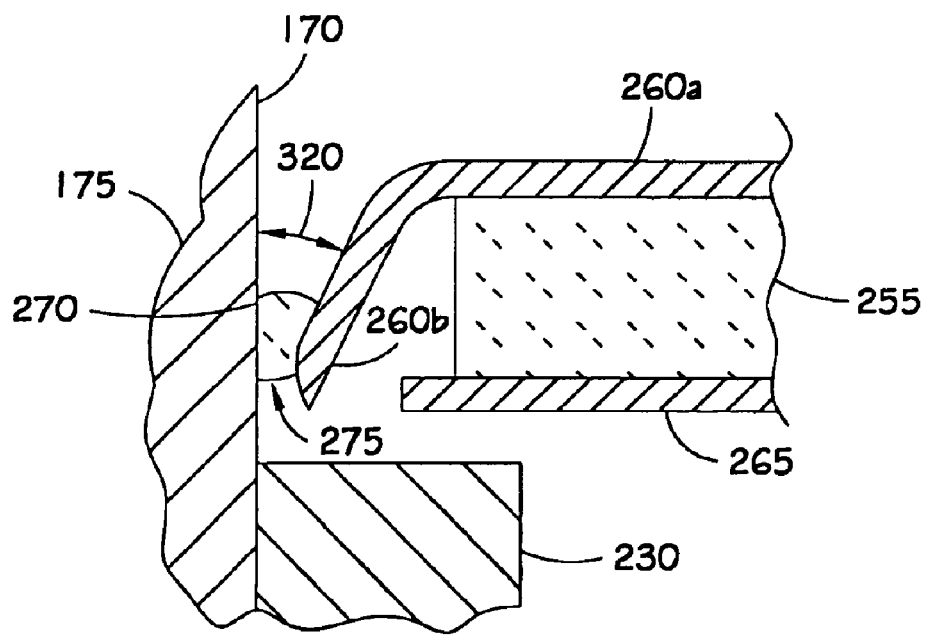
FIG. 8 is a partial sectional side view of ferrofluidic seal having a bent L-shaped top pole piece in a facing relationship with a straight shaft according to an embodiment of the present invention.
Figure 9:
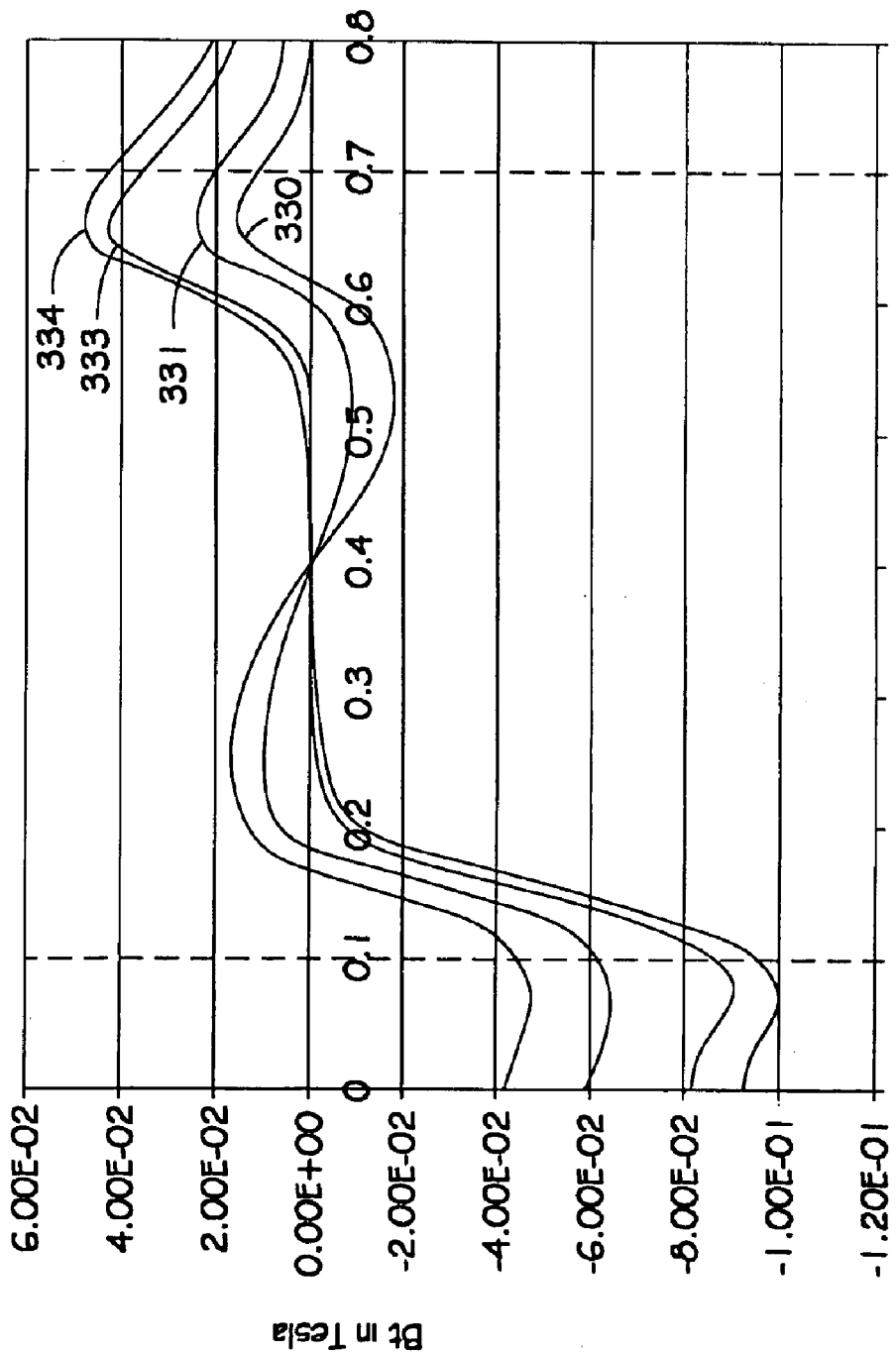
FIG. 9 is a graph showing the gradient in magnetic flux introduced in a ferrofluidic seal using a bent top pole piece as shown FIG. 8.

In yet another alternative, shown in FIG. 8, the L-shaped top pole piece 260 can be bent so that the vertical portion 260b forms an angle 320 with a shaft 175 having a straight outer surface 170. In this embodiment, the magnetic flux is concentrated at the lower end or tip 290 of the vertical portion 260b which is closer to the shaft 175. FIG. 9 is a graph showing the gradient in magnetic flux introduced in a ferrofluidic seal 185 using a top pole piece in which the vertical portion forms various angles 320 with the outer surface 170 of the shaft 175. Lines of 330, 331, 333 and 334 show the magnetic flux gradient for bent top pole pieces forming angles 320 of 0, 10, 30 and 40 degrees respectively.

Figure 10:
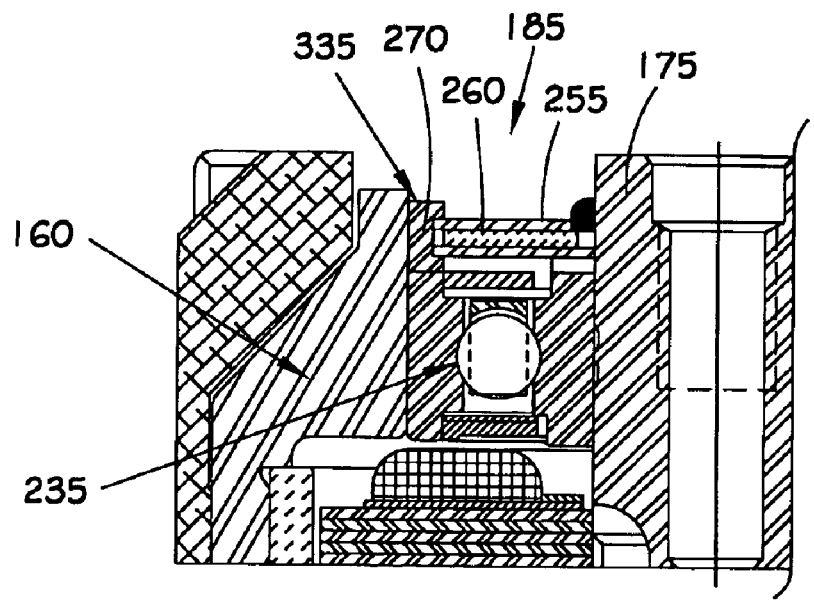
FIG. 10 is a partial sectional side view of a spindle motor having an outside ferrofluidic seal with a catcher according to an embodiment of the present invention.

In another aspect shown in FIG. 10, the invention is directed to a ferrofluidic seal 185 having a catcher 335 to reduce splashing or outward migration of the ferrofluid 270 when the ferrofluidic seal is used to form an outside seal. In this embodiment, the ferrofluidic seal 185 includes an annular magnet 255 with a pair of annular pole pieces 260, 265, coupled to opposite poles thereof positioned between the shaft 175 and the hub 160. The pole pieces 260, 265, are made from a magnetically permeable material and have exterior radii that are smaller than a radius of the inner surface 165 of the hub 160. The catcher 335 is affixed to the inner surface 165 of the hub 160. The catcher 335 includes an annular ring of magnetically permeable material and has a curved surface in a facing relationship to the exterior radii of the pole pieces 260, 265. The ferrofluid 270 is magnetically held in the gap 275 separating the pole pieces 260, 265, from the catcher 335 to form a seal therebetween, so that when the hub 160 is rotated relative to the shaft 175, splashing and outward migration of the ferrofluid 270 is greatly reduced. Preferably, the curved surface has a cross-sectional area having a semi-circular or U-shape, and which is oriented with relation to the exterior radii of the pole pieces 260, 265, so that open ends of the U-shape extend radially inward past the exterior radii of the pole pieces. The catcher 335 can be made from a single piece, or can have a top and a bottom portion (not shown) that are joined to form the curved surface, and one of which can be integrally formed with the hub 160. The catcher 335 can be affixed to the hub 160 by any suitable means including an adhesive, such as an epoxy, an o-ring or a plastic bonder.

In one embodiment, the shaft 175, the pole pieces 260, 265, ferrofluid 270, catcher 335 and hub 160 are made of electrically conductive materials such that the pole pieces are electrically coupled to the shaft, the ferrofluid is electrically coupled to the pole pieces and to the catcher, and the catcher is electrically coupled to the hub. Preferably, the outer radii of the pole pieces 260, 265, and the inner radius of the hub 160 are selected so that the surface area of ferrofluid 270 electrically coupling the pole pieces to the catcher 335 provides a resistance of less than about $1 \times 10^9$ ohms. More preferably, the surface areas are selected to provide a resistance of less than about $0.4 \times 10^9$ ohms, and most preferably less than $0.22 \times 10^9$ ohms. The pole pieces 260, 265, can be electrically coupled to the shaft 175 through electrically conductive epoxy or a press fit between the pole pieces and the shaft.

In yet another aspect, the present invention is directed to a stationary ferrofluidic seal for sealing a stationary shaft to a rotating hub. In a conventional ferrofluidic seal the magnet and pole pieces are directly attached to either the inner surface of the hub or the outer surface of the shaft, and are positioned to face the corresponding surface. Typically, the ferrofluidic seal is attached to the hub and rotates with the hub about the shaft. As described above, this rotation causes a velocity gradient across the ferrofluid magnetically held between the pole pieces and the outer surface of the shaft. Centrifugal forces developed in the ferrofluid at high speeds often exceed the ability of the magnetic flux to hold the ferrofluid against the shaft, resulting in the failure of the ferrofluidic seal to maintain a hermetic seal.

An embodiment of a stationary ferrofluidic seal 345 for sealing a stationary shaft 350 to a rotating hub 355 according to the present invention will now be described with respect to FIG. 11. In the present invention, a support arm 360 is provided which is attached at its inner or proximal end 365 to an outer surface 370 of the stationary shaft 350 and at a distal end 375 to a laminate 380 of a magnet 385 with top and bottom pole pieces 390,395, coupled to opposite poles thereof. The support arm 360 extends radially almost to the interior surface of the hub 355, leaving just a small space to allow for free rotation of the hub past the stationary support arm. Generally, the support arm 360 is formed of a non-magnetic material to eliminate magnetic coupling with the top pole piece 390. The laminate 380 can be fastened to the support arm 360 by any suitable means, including solder, an adhesive or epoxy, and mechanical means, such as by tabs (not shown) which are integrally formed with the support arm and are folded over an outer radius of the laminate to secure it in place.

The other key element to this design is a magnetic shield arm 400 which is attached to the hub 355 or a component affixed thereto, such as the outer race 235 of the bearing 215, so that it rotates with the hub. The magnetic shield arm 400 can be fastened to the hub 355 (or a component affixed thereto) by any suitable means, including solder, an adhesive or epoxy. The magnetic shield arm 400 generally includes a flat annular disk with a cylinder joined to an inner radius thereof, and which has a cross-sectional area that is L-shaped, with a radially extending section 400*a* that extends from the hub 355 to a point intermediate the inner radius of the laminate 380 and the outer surface 370 of the shaft 350, and an axially extending shield portion 400*b*.

The magnetic shield arm 400 is formed from a magnetically permeable material and ferrofluid 270 is magnetically held in a gap 405 between the pole pieces 390, 395 of the laminate, and an inner surface of the shield portion 400*b* to complete the seal between the shaft 350 and the hub 355. In one preferred embodiment, the magnetic shield arm 400 includes a thin layer or cladding 285 of Nickel on a surface thereof to provide a sufficiently smooth surface to enhance the seal of the ferrofluid, as described above. Since the shield portion 400*a* of the rotating magnetic shield arm 400 is interior to the inner radius of the laminate 380, between the magnet 385, which is stationary, and the shaft 350, which is also stationary, the velocity gradient acting on the ferrofluid 270 decreases from the rotating surface of the magnetic shield arm 400 outward toward the stationary surface of the laminate 380. Thus, the centrifugal forces acting on the ferrofluid 270 that could cause it to fly out of the gap 405 are dramatically diminished. Moreover, those centrifugal forces that are created by the rotation of the shield portion 400*b* acting on the ferrofluid 270 in this region will now tend to force it from the shield portion of the magnetic shield arm 400 toward the laminate 380, thereby catching and retaining the ferrofluid between the shield portion and the laminate. Thus, the integrity of the hermetic seal between the spindle motor 155 and the disc chamber is maintained even at high rotational speeds exceeding 13,000 rpm.

Figure 11:
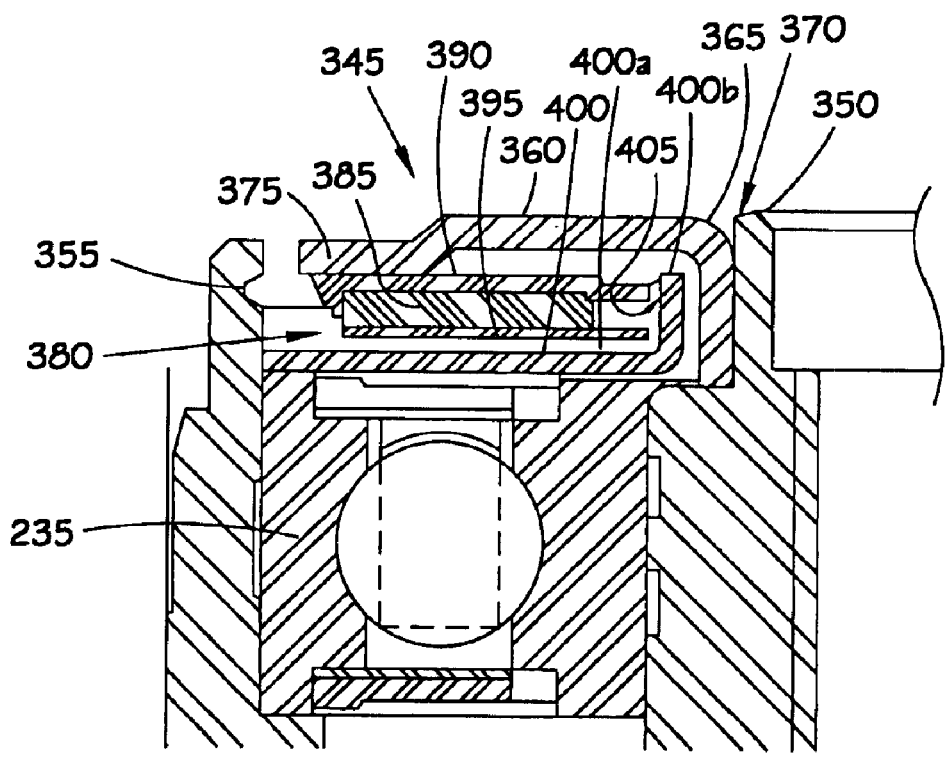
FIG. 11 is a partial sectional side view of a spindle motor with a fixed shaft and a stationary ferrofluidic seal according to an embodiment of the present invention.

In the embodiment shown in FIG. 11, the top pole piece has a z-shaped cross-sectional area, such as commonly used to concentrate the magnetic flux from the top pole piece 390. However, the top pole piece 390 can also have a cross-sectional area that is L-shaped as described above. Moreover, either the outer surface of the vertical portion 260*b* of the L-shaped top pole piece or the inner surface of the shield portion 400*b* can include a contoured portion 285, also described above, to axially concentrate the magnetic flux, thereby extending the life of the ferrofluidic seal 345.

In addition, all or part of the surface of the magnetic shield arm 400 can be coated with a fluoro-polymer, such as Nyebar®, to form a barrier film 295 as described above. The key area for placement of the barrier film 295 is in the interior corner of the juncture between the shield portion 400*b* and the radially extending portion 400*a* of the magnetic shield arm 400. Less critically, it has also been found desirable to apply a barrier film 295 to the outer surface of the shield portion 400*b* facing the shaft 350 or the proximal end 365 of the support arm 360, and to the lower surface of the bottom pole piece 395. Applying a barrier film 295 to the outer surface of the shield portion 400*b* will eliminate or reduce migration of the ferrofluid 270 into the spindle motor 155. Applying a barrier film 295 to the lower surface of the bottom pole piece 395 will further reduced migration of the ferrofluid 270 between the bottom pole piece and the magnetic shield arm 400. Generally, a barrier film 295 is not applied to the inner sealing surface of the shield portion to avoid interference with operation of the ferrofluidic seal 345. However, it has been found that entire magnetic shield arm 400 can be dipped to form a barrier film 295 over the entire surface thereof, and will not interfere with the operation of the ferrofluidic seal 345 provided the layer of fluoro-polymer is sufficiently thin.

Some of the important aspects of the present invention will now be repeated to further emphasize their structure, function and advantages.

In one aspect, a seal is provided for sealing an outer surface of a magnetically permeable shaft to an inner surface of a hub disposed about the shaft. The seal includes an annular magnet positioned between the shaft and the hub, a top pole piece and a bottom pole piece coupled to opposite poles of the magnet, the top and bottom pole pieces including a material which is magnetically permeable, and having annular shapes with interior radii that are larger than the radius of the outer surface of the shaft, the top pole piece including a cross-sectional area that is substantially L-shaped, having a long horizontal portion substantially parallel to a surface of a pole of the magnet, and a shorter vertical portion in a facing, non-contact relationship to the outer surface of the shaft, and a ferrofluid magnetically held between the vertical portion of the top pole piece and the outer surface of the shaft to form a seal therebetween.

In one embodiment, the top pole piece is separated from the outer surface of the shaft by a gap which is smaller than a distance separating the top pole piece from the bottom pole piece. In another embodiment, the shaft further includes and an inner race of a bearing separating the shaft from the hub, and the gap is smaller than a distance separating the top pole piece from the inner race of the bearing. In still another embodiment, the top pole piece includes a curved corner where the vertical portion joins the horizontal portion to spread a magnetic flux gradient over a larger area thereby enabling the ferrofluid to be held over a larger area. In yet another embodiment, the vertical portion of the top pole piece includes a curved tip at its lower end to spread a magnetic flux gradient over a larger area thereby enabling the ferrofluid to be held over a larger area. In another embodiment, the bottom pole piece includes an interior radius that is smaller than an interior radius of the top pole piece, and the vertical portion of the top pole piece extends between the interior radius of the bottom pole piece and outer surface of the shaft. In still another embodiment, the vertical portion of the top pole piece is tapered from where it joins the horizontal portion to a lower tip of the vertical portion to increase the distance separating the top pole piece from the bottom pole piece. In yet another embodiment, a Nyebar® coating is applied to the horizontal portion of the top pole piece to reduce radial migration of the ferrofluid away from the outer surface of the shaft. In a another embodiment, a Nickel cladding is applied to the top pole piece to provide a substantially smooth surface in contact with the ferrofluid. In still another embodiment, the shaft includes a contoured portion, and the seal is positioned between the shaft and the hub so that the vertical portion of the top pole piece is in a facing relationship to the contoured portion. In yet another embodiment, the vertical portion of the top pole piece forms an angle relative to the outer surface of the shaft to introduce a magnetic flux gradient between the top pole piece and the shaft that axially concentrates the ferrofluid therebetween. In the another embodiment, the vertical portion of the top pole piece includes a contoured surface facing the outer surface of the shaft to introduce a magnetic flux gradient between the top pole piece and the shaft that axially concentrates the ferrofluid between a center of the contoured surface of the vertical portion and the outer surface of the shaft. The seal of the present invention is particularly useful in a spindle motor, which further includes a base to which the shaft is coupled, a bearing capable of rotatably supporting the hub about the shaft, the bearing having inner and outer races affixed to the shaft and hub respectively, magnets attached to the hub, and a stator winding on the baseplate capable of interacting with the magnets on the hub to cause it to turn relative to the shaft.

In another aspect, a method of sealing an outer surface of a magnetically permeable shaft to an inner surface of a hub disposed about the shaft is provided. The method including steps of: (a) forming a laminate including an annular magnet with a top pole piece and a bottom pole piece coupled to opposite poles thereof, the top and bottom pole pieces having annular shapes with interior radii that are larger than a radius of the outer surface of the shaft, the top pole piece including a cross-sectional area that is substantially L-shaped, having a long horizontal portion substantially parallel to a surface of a pole of the magnet, and a shorter vertical portion substantially parallel to the outer surface of the shaft; (b) positioning the laminate between the outer surface of the shaft and the inner surface of the hub so that the vertical portion of the top pole piece is substantially parallel to the outer surface of the shaft; and (c) injecting a ferrofluid between the vertial portion of the top pole piece and the outer surface of the shaft to form a seal therebetween.

In one embodiment, step (b) includes the step of positioning the laminate so that the vertical portion of the top pole piece is separated from the outer surface of the shaft by a gap which is smaller than a distance separating the top pole piece from the bottom pole piece. In another embodiment, the shaft includes and an inner race of a bearing separating the shaft from the hub, and step (b) further includes the step of positioning the laminate so that the gap is smaller than a distance separating the top pole piece from the inner race of the bearing. In still another embodiment, step (a) includes the step of forming a top pole piece having a curved corner where the vertical portion joins the horizontal portion and curved tip at its lower end to spread a magnetic flux gradient over a larger area thereby enabling the ferrofluid to be held over a larger area.

In still another aspect, a seal is provided for sealing an outer surface of a magnetically permeable shaft to an inner surface of a hub disposed about the shaft. The seal includes an annular magnet with top and bottom annular pole pieces fixed to opposite poles thereof positioned between the shaft and the hub, the pole pieces having interior radii that are larger than a radius of the outer surface of the shaft, a ferrofluid magnetically held in a gap separating the top pole piece from the outer surface of the shaft to form a seal therebetween and means for spreading a magnetic flux gradient over a large area to enable the ferrofluid to be held over a larger area across the gap to the shaft.

In one embodiment, the means for spreading a magnetic flux gradient over a large area includes a cylindrical extension of the inner radius of the top pole piece, the cylindrical extension in a facing noncontact relationship with the outer surface of the shaft. In another embodiment, the gap between the cylindrical extension and the outer surface of the shaft is smaller than to a distance separating the cylindrical extension from the bottom pole piece. In still another embodiment, the shaft further includes and an inner race of a bearing separating the shaft from the hub, and the gap between the cylindrical extension and the outer surface of the shaft is smaller than a distance separating the cylindrical extension from the inner race of the bearing.

In yet another aspect, a seal is provided for sealing an outer surface of a magnetically permeable shaft to an inner surface of a hub disposed about the shaft. The seal includes an annular magnet with top and bottom annular pole pieces coupled to opposite poles thereof positioned between the shaft and the hub, the pole pieces including a magnetically permeable material and having interior radii that are larger than the radius of the outer surface of the shaft but smaller than the interior radius of the magnet, a contoured portion of the outer surface of the shaft, the contoured portion in a facing relationship with the interior radius of the top pole piece, and a ferrofluid magnetically held in a gap separating the top pole piece from the outer surface of the shaft to form a seal therebetween, whereby the contoured portion introduces a magnetic flux gradient that axially concentrates the ferrofluid in the gap between the top pole piece and the shaft.

In one embodiment, the top pole piece includes a cross-sectional area that is substantially L-shaped, having a long horizontal portion substantially parallel to a surface of a pole of the magnet, and a shorter vertical portion substantially parallel to the outer surface of the shaft, and the top pole piece is positioned so that the vertical portion is in a facing relationship with the contoured portion. In another embodiment, the contoured portion of the outer surface of the shaft includes a raised curved surface in a facing relationship with the top pole piece. In still another embodiment, the contoured portion of the outer surface of the shaft includes two inclined surfaces intersecting at an angle to form an apex of a ring about the shaft. In yet another embodiment, the contoured portion of the outer surface of the shaft includes a pair of axially separated grooves machined circumferential about the outer surface of the shaft, to form curved surface therebetween. In another embodiment, the contoured portion includes a coaxial ring affixed to the shaft. In still another embodiment, the ring includes a magnetically permeable material, and the shaft is non-magnetic.

In another aspect, a method of sealing an outer surface of a magnetically permeable shaft to an inner surface of a hub disposed about the shaft is provided. The method including steps of: (a) forming a laminate including an annular magnet with top and bottom annular pole pieces fixed to opposite poles thereof, the pole pieces having interior radii that are larger than a radius of the outer surface of the shaft; (b) forming a contoured portion on the outer surface of the shaft; (c) positioning the laminate between the outer surface of the shaft and the inner surface of the hub so that the interior radius of the top pole piece is a facing relationship with the contoured portion and separated therefrom by a gap; and (d) injecting a ferrofluid into the gap between the top pole piece and the contoured portion to be magnetically held and form a seal therebetween.

In one embodiment, step (a) includes the step of forming a laminate including a top pole piece having a cross-sectional area that is substantially L-shaped, with a long horizontal portion substantially parallel to a surface of a pole of the magnet, and a shorter vertical portion, and step (c) includes the step of positioning the laminate so that the vertical portion of the top pole piece is substantially parallel to the outer surface of the shaft, and is in a facing relationship with the contoured portion. In another embodiment, step (b) includes the step of forming a contoured portion having a raised curved surface disposed circumferentially about the shaft. In still another embodiment, step (b) includes the step of forming a contoured portion having two inclined surfaces intersecting at an angle to form an apex of a ring disposed circumferentially about the shaft. In yet another embodiment, step (b) includes the step of forming a contoured portion by machining a pair of axially separated grooves circumferentially about the shaft, to form curved surface therebetween. In another embodiment, step (b) includes the step of forming a contoured portion by affixing a coaxial ring to the shaft.

In yet another aspect, a seal is provided for sealing an outer surface of a magnetically permeable shaft to an inner surface of a hub disposed about the shaft. The seal includes an annular magnet with top and bottom annular pole pieces fixed to opposite poles thereof positioned between the shaft and the hub, the pole pieces having interior radii that are larger than a radius of the outer surface of the shaft, the top pole piece including a cross-sectional area that is substantially L-shaped, having a long horizontal portion substantially parallel to a surface of a pole of the magnet, and a shorter vertical portion substantially parallel to the outer surface of the shaft, a ferrofluid magnetically held in a gap separating the vertical portion of the top pole piece from the outer surface of the shaft to form a seal therebetween, and, means for providing a magnetic flux gradient that axially concentrates the ferrofluid in the gap between a center of the vertical portion of the top pole piece and the outer surface of the shaft.

In one embodiment, the means for providing a magnetic flux gradient includes a contoured portion of the outer surface of the shaft in a facing relationship with the vertical portion of the top pole piece. In another embodiment, the contoured portion includes a raised curved surface disposed circumferentially about the outer surface of the shaft. In still another embodiment, the contoured portion includes a pair of axially separated grooves machined circumferential about the outer surface of the shaft to form a curved surface therebetween.

In another aspect, a seal is provided for sealing an outer surface of a magnetically permeable shaft to an inner surface of a hub disposed about the shaft. The seal includes an annular magnet with a pair of annular pole pieces coupled to opposite poles thereof positioned between the shaft and the hub, the pole pieces including a magnetically permeable material and having exterior radii that are smaller than a radius of the inner surface of the hub, a catcher affixed to the inner surface of the hub, the catcher made of a magnetically permeable material and including an annular ring having a curved surface on the interior radius thereof, the curved surface in a facing relationship to the exterior radii of the pole pieces, and ferrofluid magnetically held in a gap separating the pole pieces from the catcher affixed to the inner surface of the hub, whereby when the hub rotated relative to the shaft splashing or outward migration of the ferrofluid it is substantially reduced.

In one embodiment, the curved surface includes a cross-sectional area having a U-shape, and the open ends of the U-shape extend radially inward past the exterior radii of the pole pieces. In another embodiment, the catcher includes a top and bottom portion. In still another embodiment, at least one of the top and bottom portions of catcher is integrally formed with the hub. In yet another embodiment, the catcher is affixed to hub with an adhesive, an o-ring or a plastic bonder. In another embodiment, the pole pieces, ferrofluid, catcher and hub include electrically conductive materials, and the pole pieces are electrically coupled to the shaft, the ferrofluid is electrically coupled to the pole pieces and to the catcher, and the catcher is electrically coupled to the hub, and the outer radii of the pole pieces and the inner radius of the hub are selected so that a surface area of ferrofluid electrically coupling the pole pieces to the catcher provide a resistance of less than about $1 \times 10^9$ ohms. In still another embodiment, the pole pieces are electrically coupled to the shaft through an electrically conductive epoxy or a press fit between the pole pieces and the shaft.

In still another aspect, a method of sealing an outer surface of a magnetically permeable shaft to an inner surface of a hub disposed about the shaft is provided. The method including steps of: (a) forming a laminate including a magnet with a pair of annular pole pieces fixed to opposite poles thereof, the pole pieces having exterior radii that are smaller than a radius of the inner surface of the hub; (b) providing a catcher made of a magnetically permeable material, the catcher including an annular ring having a curved surface on the interior radius thereof; (c) positioning the laminate inside the catcher so that the catcher is disposed coaxially about the laminate with the curved surface in a facing relationship to the exterior radii of the pole pieces and separated therefrom by a gap; and affixing the catcher with the laminate held therein, to the inner surface of the hub.

In one embodiment, the method further includes the step of injecting a ferrofluid into the gap between the pole pieces and the curved surface of the catcher to be magnetically held and form a seal therebetween. In another embodiment, the step of injecting the ferrofluid is performed before affixing the catcher to the inner surface of the hub. In still another embodiment, step (b) includes the step of providing a catcher having a top portion and bottom portion that when joined form name curved surface, and step (c) includes the steps of placing the laminate between the top and bottom portions and joining the top and bottom portions.

In yet another aspect, a seal is provided for sealing an outer surface of a magnetically permeable shaft to an inner surface of a hub disposed about the shaft. The seal includes an annular magnet with a pair of annular pole pieces coupled to opposite poles thereof positioned between the shaft and the hub, the pole pieces including a magnetically permeable material and having exterior radii that are smaller than a radius of the inner surface of the hub, ferrofluid magnetically held in a gap between the pole pieces and the inner surface of the hub to form a seal therebetween, and, means for containing the ferrofluid in the gap so that when the hub is rotated relative to the shaft splashing or outward migration of the ferrofluid it is substantially reduced.

In one embodiment, the means for containing the ferrofluid includes a catcher affixed to the inner surface of the hub, the catcher including an annular ring having a curved surface on the interior radius thereof, the curved surface in a facing relationship to the exterior radii of the pole pieces. In another embodiment, the curved surface includes a cross-sectional area having a U-shape, and the open ends of the U-shape extend radially inward past the exterior radii of the pole pieces. In still another embodiment, the catcher is affixed to hub with an adhesive, an o-ring or a plastic bonder.

In another aspect, a seal is provided for sealing an outer surface of a stationary shaft to an inner surface of a hub supported for rotation about the shaft by at least one bearing having an inner race and an outer race affixed to the shaft and hub respectively. The seal includes an annular magnet with a pair of annular pole pieces coupled to opposite poles thereof positioned between the shaft and the hub, a magnetic shield arm extending from said outer race over but not connected to the inner race to a position between the shaft and the magnet and pole pieces, and a ferrofluid magnetically held between the pole pieces and the magnetic shield arm to form a seal between the shaft and the hub.

In one embodiment, the magnet has an interior radius that is larger than a radius of the outer surface of the shaft, and the pole pieces having interior radii that are larger than the radius of the outer surface of the shaft but smaller than the interior radius of the magnet, and the magnetic shield arm extends between the inner radii of the pole pieces and the shaft. In another embodiment, the magnetic shield arm includes a cross-sectional area that is substantially L-shaped, having a radial segment fastened to the outer race at of sufficient length to extend over and interior to the inner race and a axial segment extending substantially parallel to the shaft and between the shaft and the poles of the magnetic seal. In still another embodiment, the seal further includes a support arm extending axially from the stationary shaft towards the hub, a distal region of the support arm from the shaft supporting a radially outer end of the annular magnet and annular pole pieces, the annular magnet and annular pole pieces extending radially inward towards the shaft from the support arm. In yet another embodiment, a Nyebar® coating is applied to the magnetic shield arm to reduce radial migration of the ferrofluid away from the seal. In another embodiment, a Nickel cladding is applied to the magnetic shield arm to provide a substantially smooth surface in contact with the ferrofluid. In still another embodiment, the top pole piece includes a cross-sectional area that is substantially L-shaped, having a long horizontal portion substantially parallel to a surface of a pole of the magnet, and a shorter vertical portion in a facing relationship with and substantially parallel to a shield portion of the magnetic shield arm. In yet another embodiment, the vertical portion of the top pole piece includes a contoured surface facing the shield portion of the magnetic shield arm to introduce a magnetic flux gradient between the top pole piece and the shield portion that axially concentrates the ferrofluid between a center of the contoured surface of the vertical portion and the shield portion of the magnetic shield arm.

In still another aspect, spindle motor is provided for use in a disc drive. The spindle motor includes a base, a stationary shaft coupled to the base, the shaft having an outer surface, a hub supported for rotation about the shaft by at least one bearing having inner and outer races affixed to the shaft and hub respectively, and a seal for sealing an outer surface of the shaft to an inner surface of the hub. The seal includes an annular magnet with a pair of annular pole pieces coupled to opposite poles thereof positioned between the outer surface of the shaft and the inner surface of the hub, a magnetic shield arm extending from said outer race over but not connected to the inner race to a position between the shaft and the magnet and pole pieces, and a ferrofluid magnetically held between the pole pieces and the magnetic shield arm to form a seal between the shaft and the hub.

In one embodiment, the magnet has an interior radius that is larger than a radius of the outer surface of the shaft, and the pole pieces having interior radii that are larger than the radius of the outer surface of the shaft but smaller than the interior radius of the magnet, and the magnetic shield arm extends between the inner radii of the pole pieces and the shaft. In another embodiment, the magnetic shield arm includes a cross-sectional area that is substantially L-shaped, having a radial segment fastened to the outer race at of sufficient length to extend over and interior to the inner race and a axial segment extending substantially parallel to the shaft and between the shaft and the poles of the magnetic seal. In still another embodiment, the seal further includes a support arm extending from the stationary shaft radially towards the hub, a distal region of the support arm from the shaft supporting the annular magnet and annular pole pieces, the annular magnet and annular pole pieces extending radially inward towards the shaft from the support arm. In yet another embodiment, the support arm includes a non-magnetic material. In another mind, the magnetic shield arm includes a magnetic stainless steel material.

In yet another aspect, seal is provided for sealing an outer surface of a stationary shaft to an inner surface of a hub supported for rotation about the shaft by at least one bearing having inner and outer races affixed to the shaft and hub respectively. The seal includes an annular magnet with a pair of annual pole pieces coupled to opposite poles thereof positioned between the shaft and hub, shield means supported from the outer race and protruding up through an inner diameter of the radially extending annular magnet between the magnet and the stationary shaft, and a ferrofluid being magnetically held between the pole pieces and the magnetic shield to effectively form a seal between the shaft and the hub.

In another aspect, a seal is provided for sealing an outer surface of a stationary shaft to an inner surface of a hub supported for rotation about the shaft by at least one bearing having inner and outer races affixed to the shaft and hub respectively. The seal includes an annular magnet with a pair of annual pole pieces coupled to opposite poles thereof positioned between the shaft and hub, shield means supported from an outer race of the bearing and rotating with the outer race and the outer hub and formed of magnetic material, and, a ferrofluid being supported between the shield means and the magnet, relative rotation of the shield means relative to the magnet resulting in a fluid velocity gradient decreasing from the rotating surface of the shield outward to the stationary surface of the magnet and magnetic poles.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Thus, the scope of the appended claims should not be limited to the preferred embodiments described herein.

What is claimed is:

1. A seal for sealing an outer surface of a magnetically permeable shaft to an inner surface of a hub disposed about the shaft, the seal comprising:
   (a) an annular magnet positioned between the shaft and the hub;
   (b) a top pole piece and a bottom pole piece coupled to opposite poles of the magnet, both the top and the bottom pole pieces comprising a magnetically permeable material, and having annular shapes with interior radii that are larger than a radius of the outer surface of the shaft, the top pole piece having a cross-sectional area that is substantially L-shaped, and includes a long horizontal portion orientated substantially parallel to a surface of one of the opposite poles of the magnet, and a shorter vertical portion orientated in a facing, non-contact relationship to the outer surface of the shaft, and wherein a first gap separating the top pole piece from the outer surface of the shaft is smaller than a second gap separating the bottom pole piece from the outer surface of the shaft; and
   (c) a ferrofluid magnetically held between the vertical portion of the top pole and the outer surface of the shaft to form a seal therebetween.

2. A seal according to claim 1 wherein the first gap is smaller than a distance separating the top pole piece from the bottom pole piece.

3. A seal according to claim 2 wherein the shaft further comprises an inner race of a bearing separating the shaft from the hub, and wherein the gap is smaller than a distance separating the top pole piece from the inner race of the bearing.

4. A seal according to claim 1 wherein the top pole piece comprises a curved corner where the vertical portion joins the horizontal portion, the curved corner being adapted to generate a magnetic flux gradient over a larger area, thereby enabling the ferrofluid to be held over a larger area.

5. A seal according to claim 1 wherein a cladding is applied to the top pole piece to provide a substantially smooth surface for contacting with the ferrofluid.

6. A seal according to claim 1 wherein the shaft comprises a contoured portion, and wherein the seal is positioned between the shaft and the hub so that the vertical portion of the top pole piece faces the contoured portion.

7. A spindle motor comprising the seal of claim 1, the spindle motor further comprising:
   (a) a base to which the shaft is coupled;
   (b) a bearing capable of rotatably supporting the hub about the shaft, the bearing having inner and outer races affixed, respectively, to the shaft and to the hub;
   (c) magnets attached to the hub; and
   (d) a stator winding coupled to the base and adapted for interacting with the magnets on the hub to cause the hub to rotate relative to the shaft.

8. A seal for sealing an outer surface of a magnetically permeable shaft to an inner surface of a hub disposed about the shaft, the seal comprising:
   (a) an annular magnet positioned between the shaft and the hub;
   (b) a top pole piece and a bottom pole piece coupled to opposite poles of the magnet, the top and bottom pole pieces having non-identical cross sections, both the top and the bottom pole pieces comprising a magnetically permeable material and having annular shapes with interior radii that are larger than a radius of the outer surface of the shaft, the top pole piece having a cross-sectional area that is substantially L-shaped, and includes a long horizontal portion orientated substantially parallel to a surface of one of the opposite poles of the magnet, and a shorter vertical portion orientated in a facing, non-contact relationship to the outer surface of the shaft; and
   (c) a ferrofluid magnetically held between the vertical portion of the top pole and the outer surface of the shaft to form a seal therebetween.

* * * * *